(12) United States Patent
Kim et al.

(10) Patent No.: US 9,097,400 B2
(45) Date of Patent: Aug. 4, 2015

(54) AUTOMOTIVE HEADLAMP (71) Applicant: SL Corporation, Daegu (KR)

(72) Inventors: Jong Woon Kim, Gyeongsan (KR); Dae Gon Kim, Gyeongsan (KR)

(73) Assignee: SL Corporation, Daegu (KR)

( * ) Notice: Subject to any disclaimer, the term of this patent is extended or adjusted under 35 U.S.C. 154(b) by 46 days.

(21) Appl. No.: 13/657,536

(22) Filed: Oct. 22, 2012

(65) Prior Publication Data

US 2013/0107560 A1    May 2, 2013

(30) Foreign Application Priority Data

Oct. 31, 2011  (KR) .................. 10-2011-0112376
Sep. 25, 2012  (KR) .................. 10-2012-0106615

(51) Int. Cl.
*F21S 8/10*  (2006.01)
*B60Q 1/00*  (2006.01)

(52) U.S. Cl.
CPC ......... *F21S 48/1159* (2013.01); *F21S 48/1388* (2013.01); *F21S 48/1747* (2013.01); *F21S 48/321* (2013.01); *F21S 48/328* (2013.01); *B60Q 1/0029* (2013.01); *B60Q 1/0041* (2013.01); *F21S 48/115* (2013.01); *F21S 48/13* (2013.01); *F21S 48/1305* (2013.01); *F21S 48/1784* (2013.01); *F21S 48/32* (2013.01)

(58) Field of Classification Search
CPC .. B60Q 1/0029; B60Q 1/0041; B60Q 1/0058; B60Q 1/0683; B60Q 2200/32; F21V 29/004; F21V 29/22; F21V 29/2206
USPC ......... 362/525, 538, 539, 543–545, 547, 294, 362/516
See application file for complete search history.

(56) References Cited

U.S. PATENT DOCUMENTS 7,344,289  B2 *  3/2008  Fallahi et al. ............... 362/547
2005/0068787  A1 *  3/2005  Ishida ......................... 362/538
2006/0120094  A1 *  6/2006  Tsukamoto et al. ......... 362/518

(Continued)

FOREIGN PATENT DOCUMENTS

CN            102109137 A      6/2011
DE   10 2010 013 821 A1     10/2011

(Continued)

OTHER PUBLICATIONS

European Search Report dated May 22, 2015 in corresponding EP Application No. 12007370.5.

*Primary Examiner* — Peggy Neils
*Assistant Examiner* — Zheng Song
(74) *Attorney, Agent, or Firm* — Mintz Levin Cohn Ferris Glovsky and Popeo, P.C.; Kongsik Kim; Carolina E. Säve (57) ABSTRACT Provided is a headlamp of a vehicle, and more particularly, an automotive headlamp which is structured in a simple manner to secure a sufficient amount of light, emit light in different beam patterns, and improve heat dissipation efficiency thereof. The automotive headlamp includes: a plurality of lamp modules disposed in different directions from an optical axis of the automotive headlamp; and a projection lens projecting light emitted from one or more of the lamp modules. Each of the lamp modules includes a light source unit emitting light downward, and a reflector disposed under the light source unit and reflecting light emitted from the light source unit.

12 Claims, 13 Drawing Sheets

(56) References Cited

U.S. PATENT DOCUMENTS

| | | | |
|---|---|---|---|
| 2007/0025117 A1* | 2/2007 | Watanabe et al. | 362/545 |
| 2007/0091632 A1* | 4/2007 | Glovatsky et al. | 362/547 |
| 2007/0171665 A1 | 7/2007 | Finch | |
| 2007/0195545 A1* | 8/2007 | Sato et al. | 362/538 |
| 2008/0225541 A1* | 9/2008 | Ishida et al. | 362/516 |
| 2008/0266890 A1* | 10/2008 | Mochizuki et al. | 362/524 |
| 2009/0207626 A1* | 8/2009 | Kim | 362/545 |
| 2009/0251916 A1* | 10/2009 | Tanaka et al. | 362/538 |
| 2010/0067249 A1* | 3/2010 | Suzuki | 362/539 |
| 2010/0073950 A1* | 3/2010 | Kawamura | 362/538 |
| 2010/0097799 A1* | 4/2010 | Shin | 362/235 |
| 2010/0246204 A1* | 9/2010 | Inaba | 362/539 |
| 2010/0296305 A1* | 11/2010 | Toyoyama et al. | 362/516 |
| 2010/0309679 A1* | 12/2010 | Yamagata et al. | 362/539 |
| 2011/0051452 A1* | 3/2011 | Shih | 362/547 |
| 2011/0051453 A1* | 3/2011 | Nagasawa et al. | 362/547 |
| 2011/0280028 A1* | 11/2011 | Uchida | 362/516 |
| 2012/0294024 A1* | 11/2012 | Peck et al. | 362/516 |

FOREIGN PATENT DOCUMENTS

| | | |
|---|---|---|
| EP | 2184532 A2 | 5/2010 |
| EP | 2 366 941 A2 | 9/2011 |
| EP | 2 492 141 A2 | 8/2012 |
| JP | 2006-107875 A | 4/2006 |
| JP | 2010-114049 A | 5/2010 |
| JP | 2011-100583 A | 5/2011 |
| JP | 2011100583 A | 5/2011 |
| KR | 10-2011-0068864 A | 6/2011 |
| KR | 10-2011-0117418 A | 10/2011 |
| KR | 20110117418 A | 10/2011 |

* cited by examiner

AUTOMOTIVE HEADLAMP

CROSS-REFERENCE TO RELATED APPLICATION

This application claims priority from Korean Patent Application No. 10-2011-0112376 filed on Oct. 31, 2011 and 10-2012-0106615 filed on Sep. 25, 2012, which applications are incorporated herein by reference.

BACKGROUND OF THE INVENTION

1. Field of the Invention

The present invention relates to a headlamp of a vehicle, and more particularly, to an automotive headlamp which is structured in a simple manner to secure a sufficient amount of light, emit light in different/various beam patterns, and improve heat dissipation efficiency.

2. Description of the Related Art

Vehicles are typically equipped with various automotive lamps having a lighting function and a signaling function, among others. That is, automotive lamps enable the driver of the vehicle to easily detect objects around and ahead of the vehicle while driving at night or in a dark area. They also inform other vehicles and road users of the vehicle's driving state. For example, a headlamp and a fog lamp are designed for providing light, and a direction indicator, a taillight, a brake light, and a side marker are designed for signaling.

Recently, many automotive lamp manufactures have begun to use halogen lamps or high-intensity discharge (HID) lamps as light sources. Additionally, light-emitting diodes (LEDs) have been used as light sources as well. LEDs have a color temperature of approximately 5500 K which is close to that of sunlight. Thus, LEDs cause the least eye fatigue. In addition, LEDs increase the freedom of lamp design due to their small size and are economical due to their semi-permanent lifespan.

LEDs, in particular, are being introduced to reduce lamp configuration complications and decrease the number of manufacturing processes required to produce a headlamp. In particular, attempts are being made to extend lamp life using characteristics of LEDs. Furthermore, since limited space is not an issue due to the small size of the LEDs, they may be utilized in a plethora of applications.

Of the various types of automotive lamps, a headlamps use more than one beam pattern unlike other types of lamps which typically use only one. For example, the headlamp may emit light in a beam pattern optimum for driving conditions of the vehicle such as travelling speed, travelling direction, road surface conditions, and ambient brightness. In so doing, the headlamp may ensure driver visibility without blinding other vehicle drivers on the road. Generally, one or more LEDs are used to emit light in each beam pattern while securing a sufficient amount of light. However, to emit light in different beam patterns, elements corresponding to each beam pattern are required. Accordingly, this increases the number of parts, costs and space required. In addition, when LEDs are used as light sources of automotive lamps, the light emission efficiency of the LEDs rapidly deteriorate as the temperature rises.

Therefore, a solution that can emit light in various beam patterns, secure a sufficient amount of light, and prevent a temperature rise due to heat emitted from LEDs while reducing the number of parts, costs and space required to emit light in different beam patterns is required.

SUMMARY OF THE INVENTION

Aspects of the present invention provide an automotive headlamp in which a plurality of lamp modules, which use light-emitting diodes (LEDs) for emitting light in different beam patterns as light sources, are placed in different directions from an optical axis of the automotive headlamp to minimize the space required and emit light in various beam patterns and in which a lamp module for emitting light in a predetermined beam pattern consists of a plurality of lamp modules to secure a sufficient amount of light.

Aspects of the present invention also provide an automotive headlamp in which heat sinks are installed to efficiently prevent a temperature rise due to heat emitted from LEDs.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an automotive headlamp including: a plurality of lamp modules disposed in different directions from an optical axis of the automotive headlamp; and a projection lens projecting light emitted from one or more of the lamp modules, wherein each of the lamp modules includes: a light source unit emitting light downward; and a reflector disposed under the light source unit and reflecting light emitted from the light source unit.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings.

The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

In some embodiments, well-known manufacturing processes, well-known structures and well-known technologies will not be specifically described in order to avoid ambiguous interpretation of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, steps, and/or operations, but do not preclude the presence or addition of one or more other elements, steps, operations, and/or groups thereof. As used herein, the term "and/or" includes any and all combinations of one or more of the associated listed items.

Embodiments of the invention are described herein with reference to perspective, cross-sectional, side, and/or schematic illustrations that are illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, each element may be exaggerated or reduced for clarity.

Automotive headlamps according to embodiments of the present invention will now be described with reference to the attached drawings.

Figure 1:
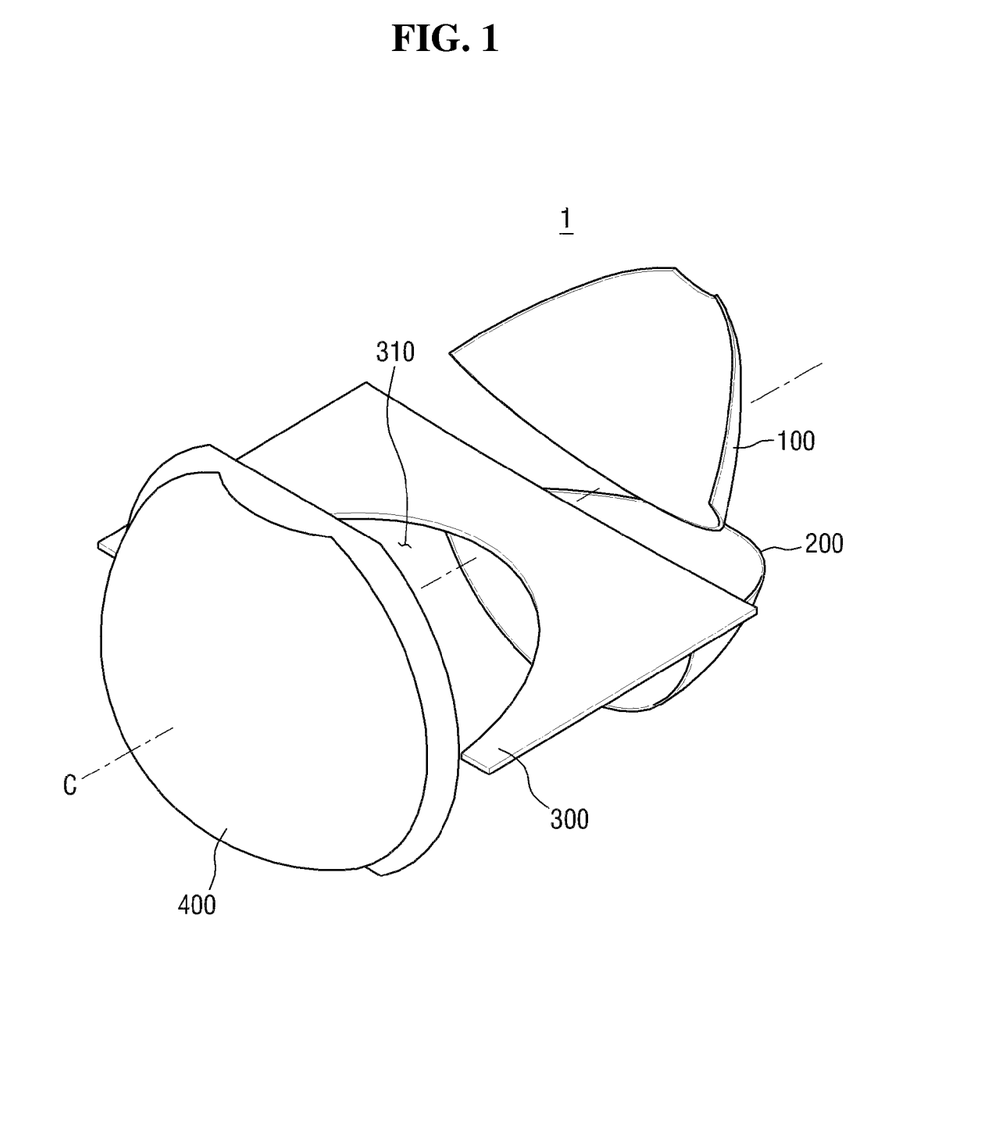
FIG. 1 is a perspective view of an automotive headlamp according to a first exemplary embodiment of the present invention.
Figure 2:
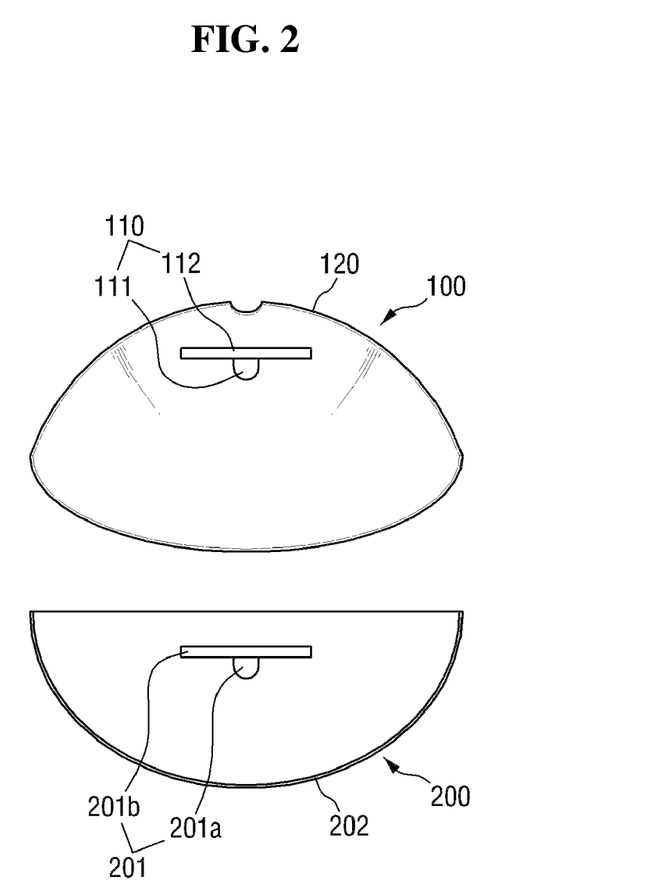
FIG. 2 is a schematic front view of a first lamp module and a second lamp module according to the first exemplary embodiment of the present invention.

FIG. 1 is a perspective view of an automotive headlamp 1 according to a first exemplary embodiment of the present invention. FIG. 2 is a schematic front view of a first lamp module 100 and a second lamp module 200 according to the first exemplary embodiment of the present invention.

Referring to FIGS. 1 and 2, the automotive headlamp 1 according to the first exemplary embodiment may include the first lamp module 100, the second lamp module 200, a shield 300, and a projection lens 400. In the first embodiment of the present invention, the first lamp module 100 and the second lamp module 200 are disposed in different directions from an optical axis C of the projection lens 400 and used/configured to emit light in different beam patterns. In the first embodiment of the present invention, the first lamp module 100 may be disposed above the optical axis C and used to emit light in a low-beam pattern, and the second lamp module 200 may be disposed below the optical axis C and used to emit light in a high-beam pattern.

In addition, the first lamp module 100 and the second lamp module 200 are used in the first embodiment of the present invention. However, the present invention is not limited thereto, and a lamp module can be added or removed according to beam patterns used.

The first lamp module 100 may include a first light source unit 110 which emits light downward and a first reflector 120 which reflects light emitted from the first light source unit 110 so that the light is directed toward a lower part of the projection lens 400. The first light source unit 110 may include a light source 111 and a substrate 112 on which the light source 111 is installed. The light source 111 may be installed on a bottom surface of the substrate 112 to emit light downward. The first reflector 120 may be disposed under the first light source unit 110 to reflect light emitted from the first light source unit 110 and may be shaped in the form of an oval or free curved surface having an open surface.

The second lamp module 200 may include a second light source 201 which emits light downward and a second reflector 202 which reflects light emitted from the second light source 201 such that the light travels toward an upper part of the projection lens 400. Like the first light source unit 110, the second light source unit 201 may include a light source 201a and a substrate 201b on which the light source 201a is installed. The light source 201a may be installed on a bottom surface of the substrate 201b to emit light downward. Also like the first reflector 120, the second reflector 202 may be disposed under the second light source unit 201 to reflect light emitted from the second light source unit 201 and may be shaped like an oval or free curved surface having an open surface.

In the first embodiment of the present invention, the light source 111 of the first light source unit 110 and the light source 201a of the second light source unit 201 may be, but are not limited to, light-emitting diodes (LEDs). In addition, the first reflector 120 and the second reflector 202 may be physically connected to each other or separated from each other. When the first reflector 120 and the second reflector 202 are disposed under the first light source unit 110 and the second light source unit 201, respectively, the entire first reflector 120 and the entire second reflector 202 may be disposed under the first light source unit 110 and the second light source unit 201, respectively, or part of the first reflector 120 and part of the second reflector 202 may be disposed under the first light source unit 110 and the second light source unit 201, respectively.

In the first embodiment of the present invention, light emitted from the first lamp module 100 may travel toward the lower part of the projection lens 400, and light emitted from the second lamp module 200 may travel toward the upper part of the projection lens 400. To this end, the first reflector 120 may reflect the light emitted from the first lamp module 100 toward the lower part of the projection lens 400, and the second reflector 202 may reflect the light emitted from the second lamp module 200 toward the upper part of the projection lens 400. In addition, each of the first lamp module 100 and the second lamp module 200 may be placed at a predetermined angle to the optical axis C.

The shield 300 may be disposed in front of the first lamp module 100 and the second lamp module 200. The shield 300 may form a predetermined cut-off line by blocking part of light emitted from one or more of the first lamp module 100 and the second lamp module 200. The shield 300 may be shaped like a plate having a semicircular groove 310 at a side thereof. The shape of the groove 310 can vary, however, and is not limited to the illustrative embodiment of the present invention.

In the first exemplary embodiment of the present invention, the shield 300 may block or reflect part of light emitted from the first lamp module 100 in order to project the light in the low-beam pattern. To reflect part of light, a surface of the shield 300 may be coated with a reflective layer.

In FIGS. 1 and 2 described above, one lamp module is disposed above and below the optical axis C. However, this is merely an example used to help understand the present invention, and the present invention is not limited to this example. One or more of the first lamp module 100 and the second lamp module 200 may also consist of a plurality of lamp modules arranged in a particular direction.

Figure 3:
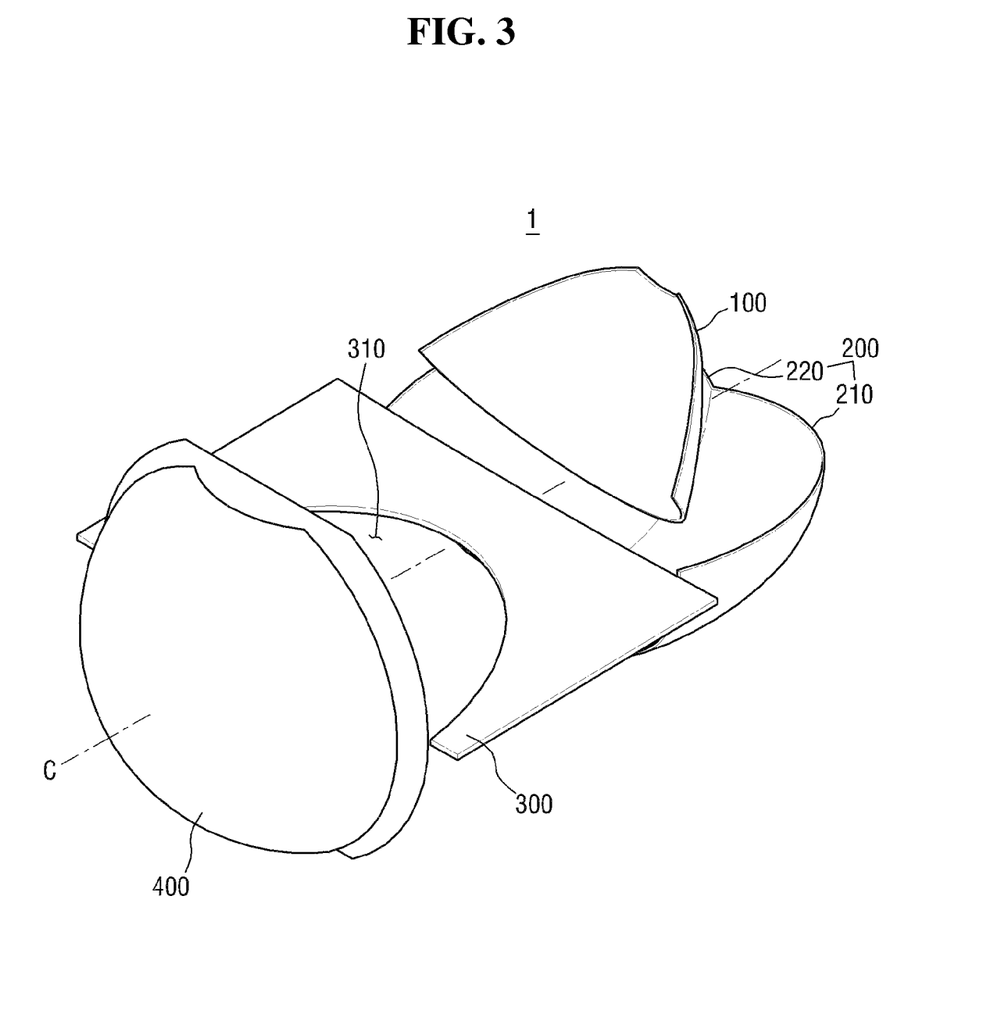
FIG. 3 is a perspective view of an automotive headlamp according to a second exemplary embodiment of the present invention.
Figure 4:
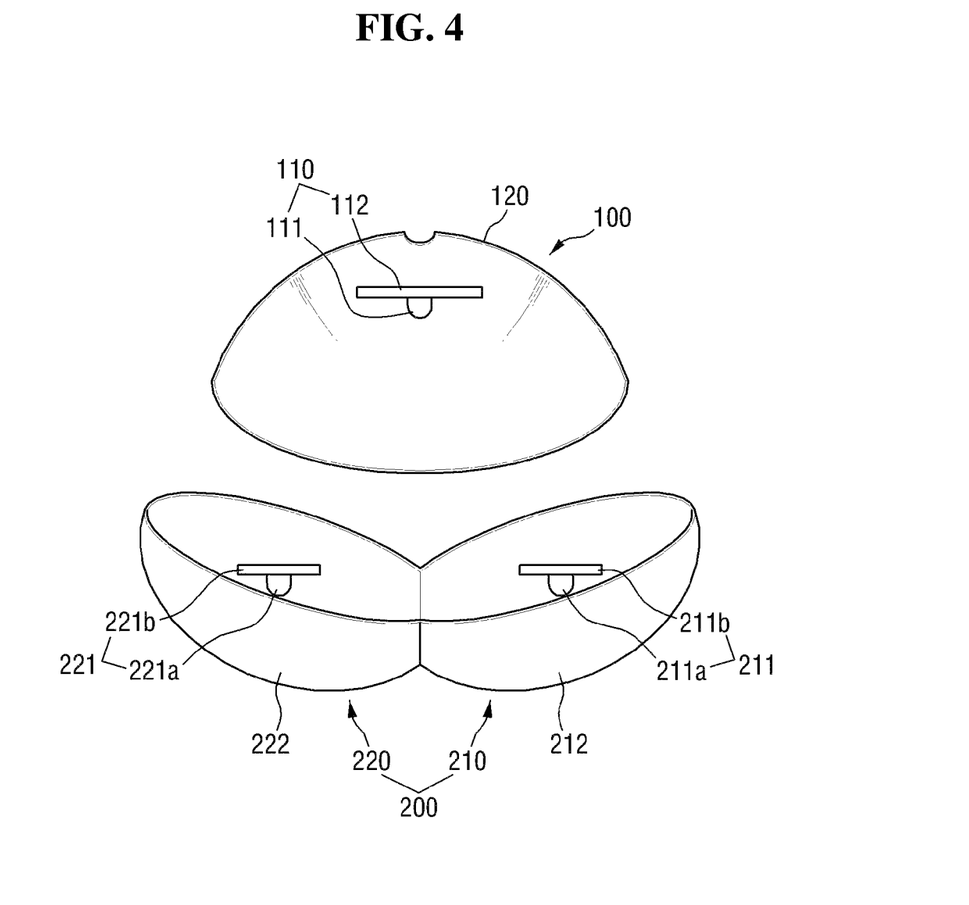
FIG. 4 is a schematic front view of a first lamp module and a second lamp module according to the second exemplary embodiment of the present invention.

FIG. 3 is a perspective view of an automotive headlamp 1 according to a second exemplary embodiment of the present invention. FIG. 4 is a schematic front view of a first lamp module 100 and a second lamp module 200 according to the second embodiment of the present invention. In FIGS. 3 and 4, the second lamp module 200 consists of a plurality of lamp modules. Referring to FIGS. 3 and 4, unlike the above-described automotive headlamp 1 of FIGS. 1 and 2, the automotive headlamp 1 according to the second embodiment of the present invention may include the second lamp module 200 which consists of a lamp module 210 and a lamp module 220 respectively disposed on both sides of an optical axis C. In the second embodiment of the present invention, the second lamp module 200 consists of two lamp modules. However, the number of lamp modules that constitute the second lamp module 200 can vary, and thus should not be limited hereto.

The first lamp module 100, a shield 300, and a projection lens 400 of FIGS. 3 and 4 are identical to those described above with reference to FIGS. 1 and 2, and thus a detailed description thereof will be omitted.

In the second embodiment of the present invention, the lamp module 210 and the lamp module 220 are respectively disposed on both sides of the optical axis C in an orientation which is horizontal to each other. However, the present invention is not limited thereto.

The lamp module 210 may include a light source unit 211 and a reflector 212, and the lamp module 220 may include a light source unit 221 and a reflector 222. The light source unit 211 and the light source unit 221 may include light sources 211a and 221a and substrates 211b and 221b on which the light sources 211a and 221a are installed, respectively. The light sources 211a and 221a may be disposed on bottom surfaces of the substrates 211b and 221b to emit light downward.

As in FIGS. 1 and 2, in FIGS. 3 and 4, the light source 211a of the light source unit 211 and the light source 221a of the light source unit 221 may be LEDs. The reflector 212 may be disposed under the light source unit 211 to reflect light emitted from the light source unit 211, and the reflector 222 may be disposed under the light source unit 221 to reflect light emitted from the light source unit 221. If the reflector 212 and the reflector 222 are disposed under the light source unit 211 and the light source unit 221, respectively, the whole of the reflector 212 and the whole of the reflector 222 may be disposed under the light source unit 211 and the light source unit 221, respectively, or part of the reflector 212 and part of the reflector 222 may be disposed under the light source unit 211 and the light source unit 221, respectively.

The reflector 212 and the reflector 222 may be physically connected to each other or independently attached. The light source unit 211 and the light source unit 221 may be situated at first focal points of the reflector 212 and the reflector 222, respectively. The reflector 212 and the reflector 222 may have identical or different second focal points behind the projection lens 400. If the second lamp module 200 consists of a plurality of lamp modules arranged in a particular direction as described above, a sufficient amount of light can be secured with relatively low power consumption.

Figure 5:
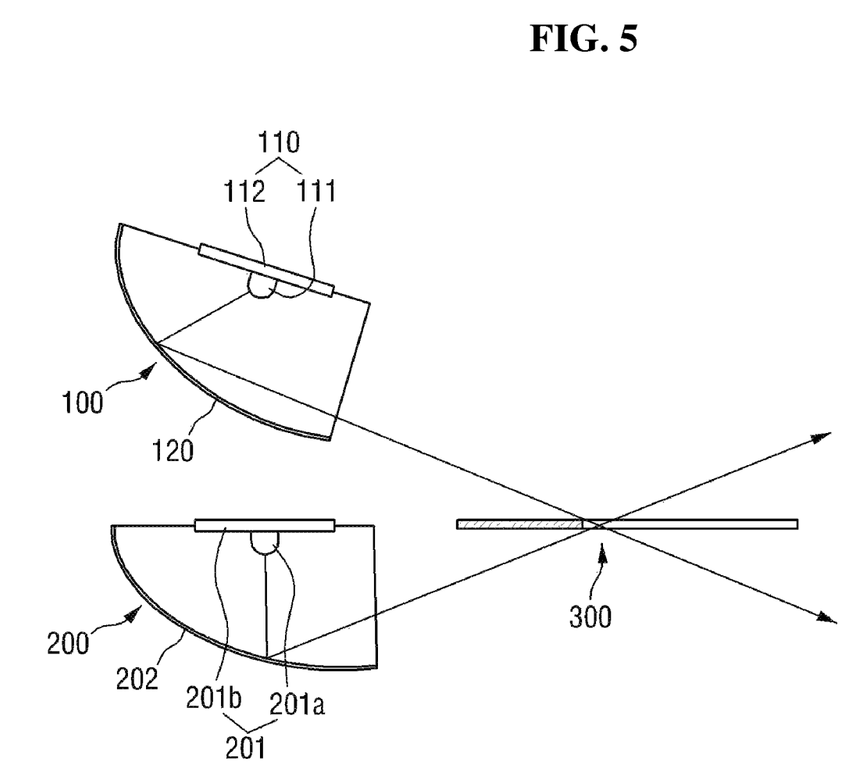
FIG. 5 is a schematic diagram illustrating the direction in which light travels in the automotive headlamp of FIGS. 1 and 2.

FIG. 5 is a schematic diagram illustrating the direction in which light travels in the automotive headlamp 1 of FIGS. 1 and 2. The principle illustrated in FIG. 5 can also apply to the automotive headlamp 1 of FIGS. 3 and 4. Referring to FIG. 5, the first lamp module 100 may be disposed above the optical axis C, and the second lamp module 200 may be disposed below the optical axis C. The shield 300 may be disposed in front of the first lamp module 100 and the second lamp module 200.

The first light source unit 110 of the first lamp module 100 and the second light source unit 201 of the second lamp module 200 emit light downward. The light emitted from the first light source unit 110 and the light emitted from the second light source unit 201 may be reflected respectively by the first reflector 120 and the second reflector 202 to reach the projection lens 400 via the shield 300, as indicated by arrows in FIG. 5.

In FIG. 5, light is passing through the groove 310 of the shield 300 to reach the projection lens 400 is illustrated as an example. However, the present invention is not limited to this case. Part of the light can also be blocked or reflected by a surface of the shield 300 which does not have the groove 310.

In the above-described embodiments of the present invention, LEDs are used as light sources. However, since LEDs are vulnerable to heat, their performance may deteriorate when the LEDs are exposed to heat. Therefore, heat sinks may be used to prevent a temperature increase due to heat emitted from the LEDs.

Figure 6:
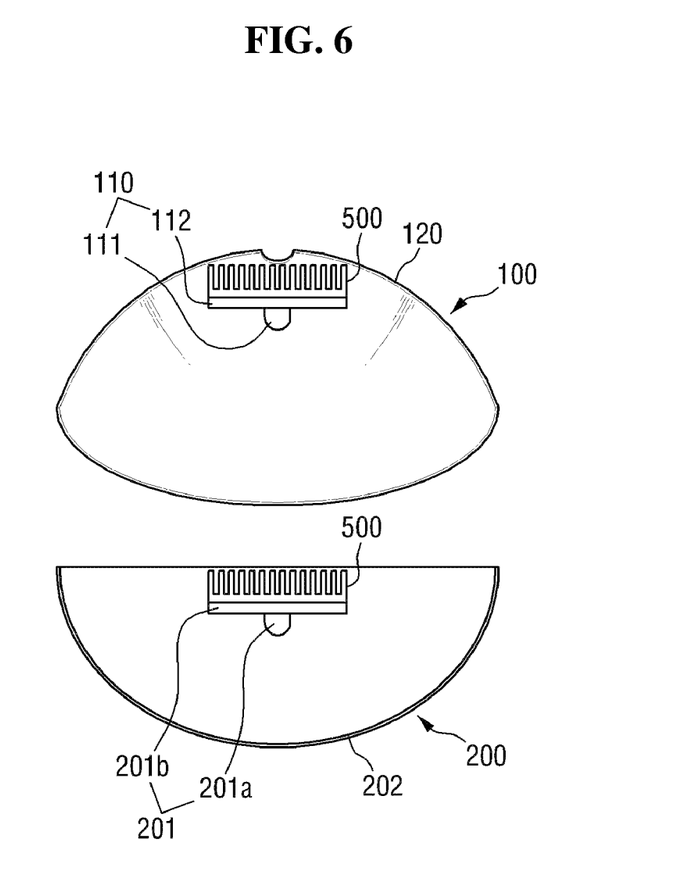
FIGS. 6 and 7 are schematic views of heat sinks according to the first exemplary embodiment of the present invention.
Figure 7:
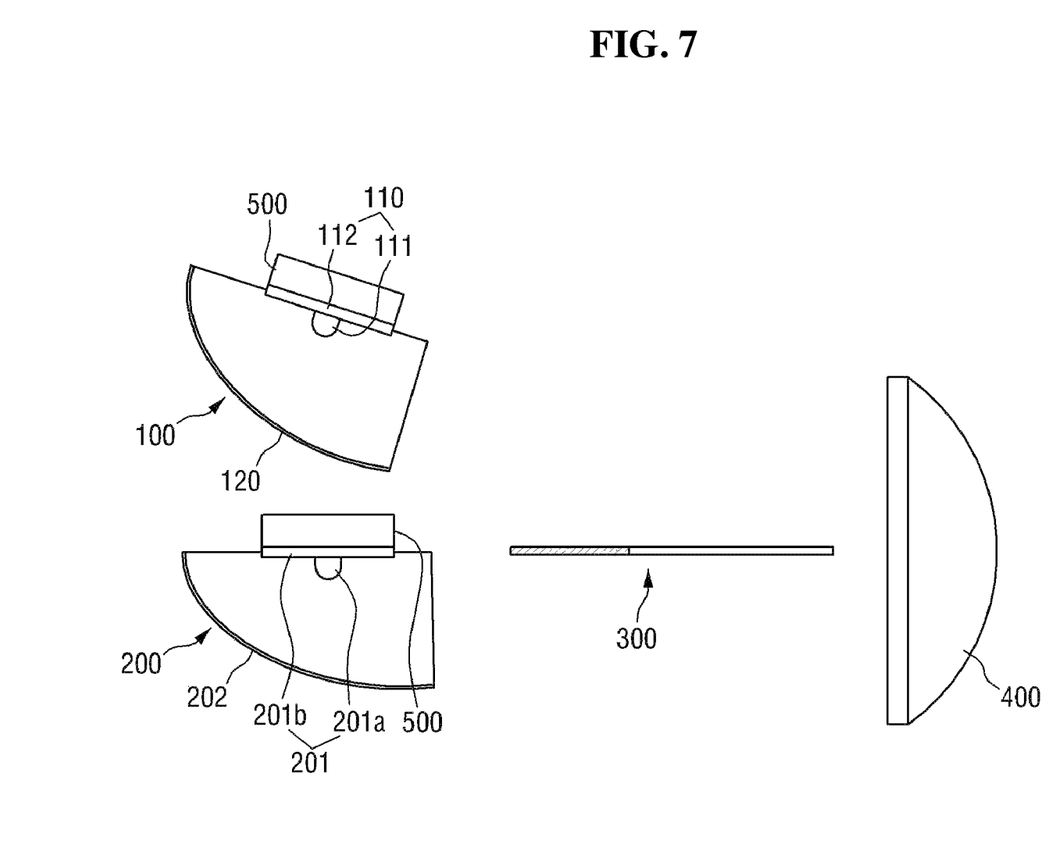

FIGS. 6 and 7 are schematic views of heat sinks 500 installed on lamp modules according to the first exemplary embodiment of the present invention. In FIGS. 6 and 7, an example heat sink 500 installed on each lamp module of the automotive headlamp 1 of FIGS. 1 and 2 is illustrated. Referring to FIGS. 6 and 7, the first lamp module 100 and the second lamp module 200 may be disposed above and below the optical axis C of the projection lens 400. In this case, the heat sinks 500 may be installed on the first lamp module 100 and the second lamp module 200, respectively.

Specifically, in the first embodiment of the present invention, the first reflector 120 is disposed under the first light source unit 110 in the first lamp module 100, and the second reflector 202 is disposed under the second light source unit 201 in the second lamp module 200. Therefore, the heat sinks 500 may be installed on the first light source unit 110 and the second light source unit 201, respectively. That is, the heat sinks 500 may be installed on a top surface of the substrate 112 of the first light source unit 110 and a top surface of the substrate 201b of the second light source unit 201, respectively.

Each substrate 112 of the first light source unit 110 and substrate 201b of the second light source unit 201 may extend in one direction along the length of a corresponding heat sink 500. For this reason, a relatively large-sized heat sink 500 can be installed. In addition, the shape of the substrate 112 of the first light source unit 110 and the shape of the substrate 201b of the second light source unit 201 can vary according to the shape of a corresponding heat sink 500.

Figure 8:
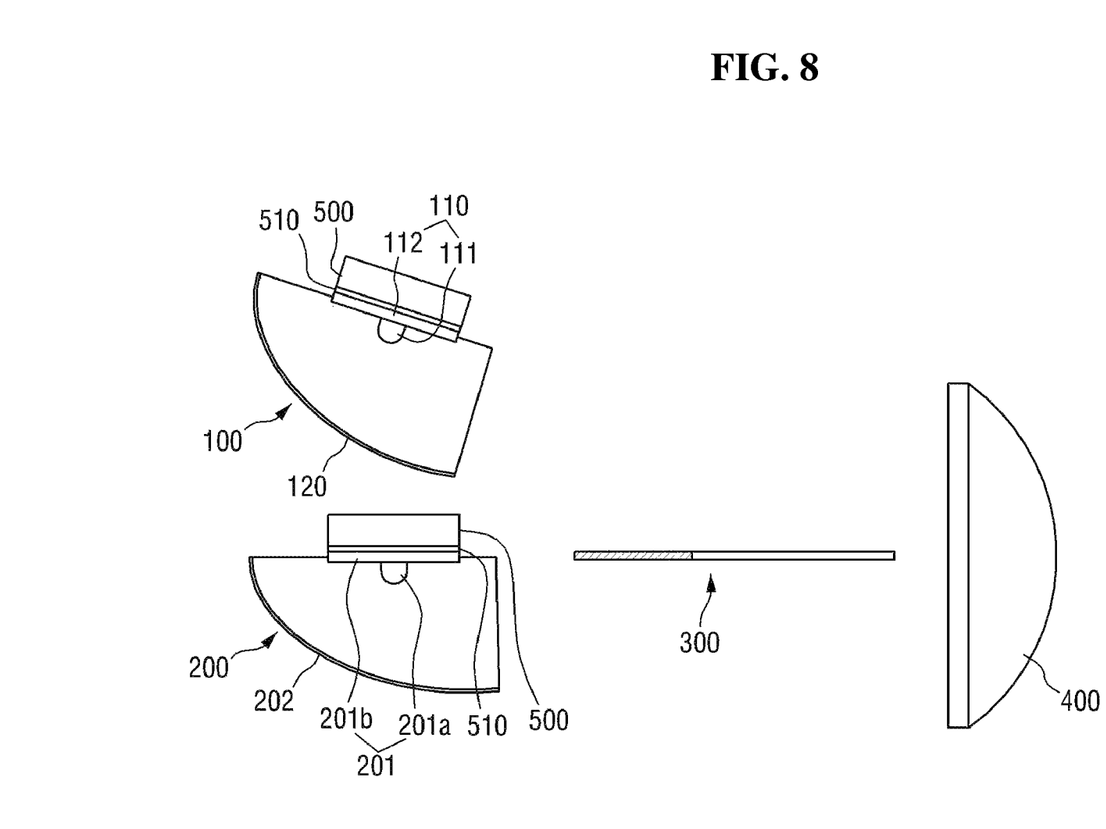
FIG. 8 is a schematic view of heat pads according to an exemplary embodiment of the present invention.

In FIGS. 6 and 7, the heat sinks 500 are installed on the first light source unit 110 and the second light source unit 201 in order to efficiently dissipate heat. That is, since heat is concentrated in upper parts of the first lamp module 100 and the second lamp module 200 due to natural convection, the heat sinks 500 may be installed on the first light source unit 110 and the second light source unit 201, respectively. Heat pads 510 may also be formed between the substrates 112 and 201b and the heat sinks 500 as shown in FIG. 8 to make contact surfaces between the substrates 112 and 201b and the heat sinks 500 level and increase heat transfer efficiency accordingly.

In the first exemplary embodiment of the present invention, each of the heat sinks 500 includes a plurality of heat dissipating pins which extend upward from above a corresponding light source unit 110 or 201. However, this is merely an example used to help understand the present invention, and the present invention is not limited to this example. Each of the heat sinks 500 may also be a heat pipe or a heat spreader. For example, a side of the heat spreader may be bent in order to increase heat transfer area.

Figure 9:
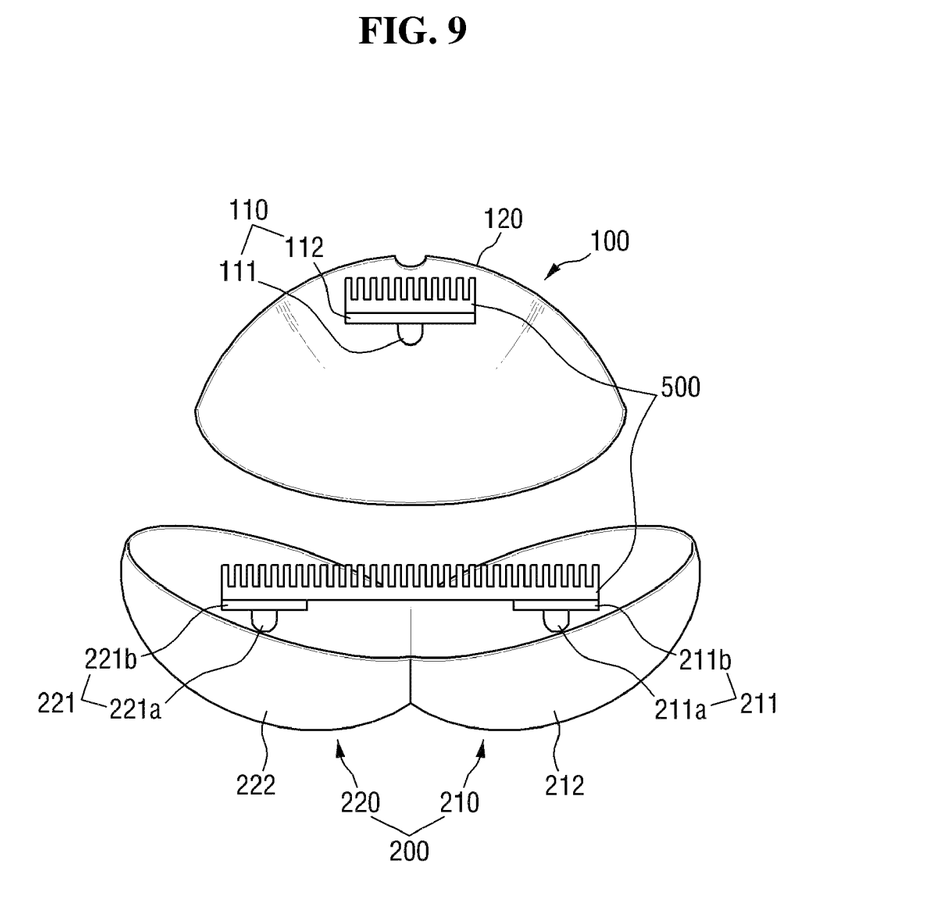
FIG. 9 is a schematic view of heat sinks according to the second exemplary embodiment of the present invention.

FIG. 9 is a schematic view of heat sinks 500 installed on lamp modules according to the second embodiment of the present invention. In FIG. 9, an example heat sink 500 installed on each lamp module of the automotive headlamp 1 of FIGS. 3 and 4 is illustrated. Referring to FIG. 9, the first lamp module 100 may be installed above the optical axis C of the projection lens 400, and the lamp module 210 and the lamp module 220 that constitute the second lamp module 200 may be disposed below the optical axis C to be horizontal to each other. In this case, the heat sinks 500 may be disposed on the lamp modules 100, 210, and 220, respectively.

Specifically, in the second embodiment of the present invention, the first reflector 120 is disposed under the first light source unit 110 in the first lamp module 100, and the reflector 212 and the reflector 222 are disposed under the light source unit 211 and the light source unit 221 in the lamp module 210 and the lamp module 220, respectively. Therefore, the heat sinks 500 may be disposed on the first light source unit 110, the light source unit 211 and the light source unit 221, respectively. That is, the heat sinks 500 may be installed on a top surface of the substrate 112 of the first light source unit 110 and top surfaces of the substrates 211*b* and 221*b* of the light source unit 211 and the light source unit 221, respectively.

In the second exemplary embodiment of the present invention, a single heat sink 500 may extend over the top surfaces of the light source unit 211 and the light source unit 221. However, the present invention is not limited thereto. Separate heat sinks 500 can also be installed on the top surfaces of the substrates 211*b* and 221*b* of the light source unit 211 and the light source unit 221, respectively.

The substrate 112 of the first light source unit 110 and the substrates 211*b* and 221*b* of the light source unit 211 and the light source unit 221 may extend in one direction along the length of a corresponding heat sink 500. For this reason, a relatively large-sized heat sink 500 can be installed. In addition, the shape of the substrate 112 of the first light source unit 110 and the shapes of the substrates 211*b* and 221*b* of the light source unit 211 and the light source unit 221 can vary according to the shape of a corresponding heat sink 500.

In FIG. 9, the heat sink 500 is installed on each light source unit 110, 211 or 221 to provide efficient heat dissipation. That is, since heat is concentrated in an upper part of each lamp module 100, 210 or 220 due to natural convection, the heat sink 500 may be installed on each light source unit 110, 211 or 221 accordingly to dissipate this heat. Although not shown in FIG. 9, heat pads may also be formed between the substrates 112, 211*b* and 221*b* and the heat sinks 500 as shown in FIG. 8 to make contact surfaces between the substrates 112, 211*b* and 221*b* and the heat sinks 500 level and increase heat transfer efficiency.

Figure 10:
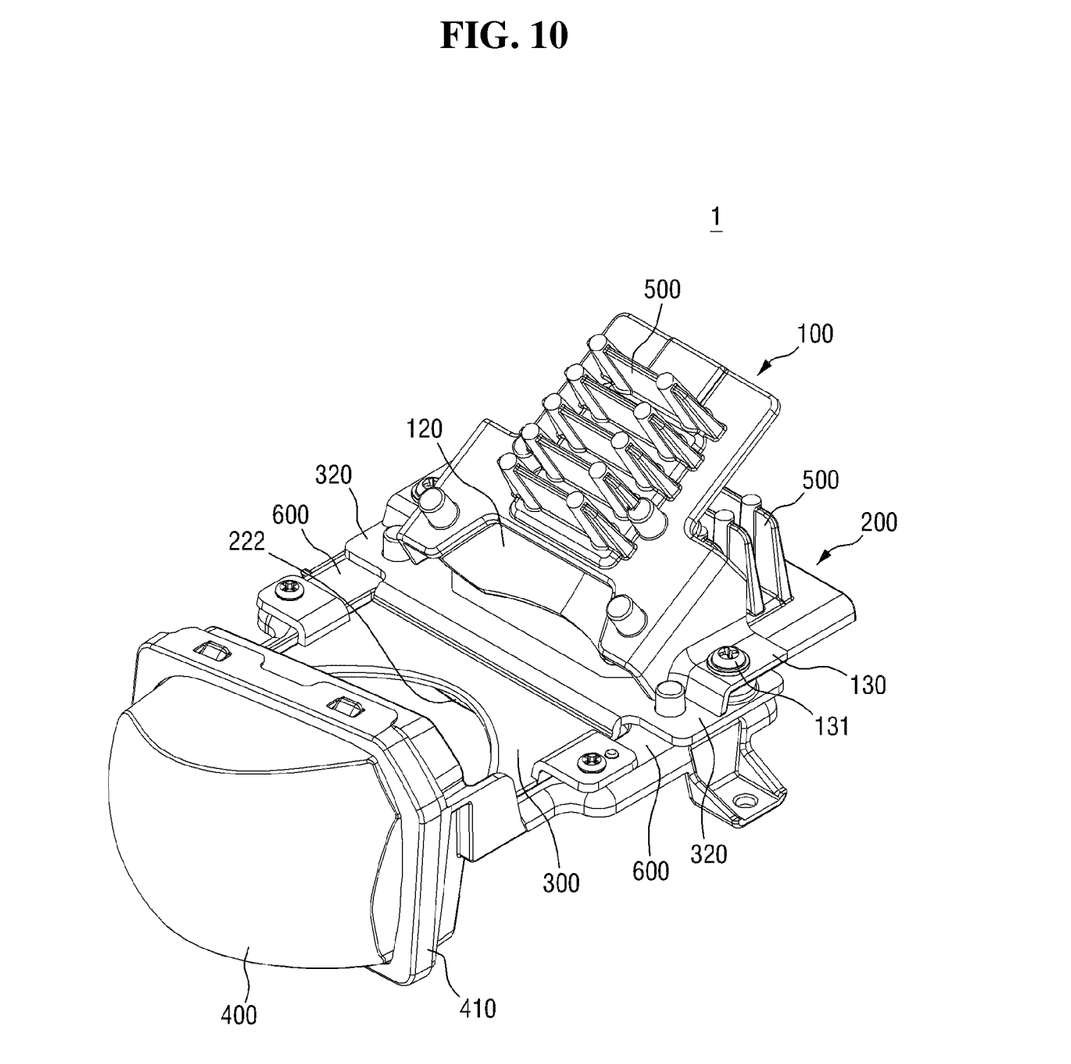
FIGS. 10 and 11 are perspective views of an assembled automotive headlamp according to an exemplary embodiment of the present invention.
Figure 11:
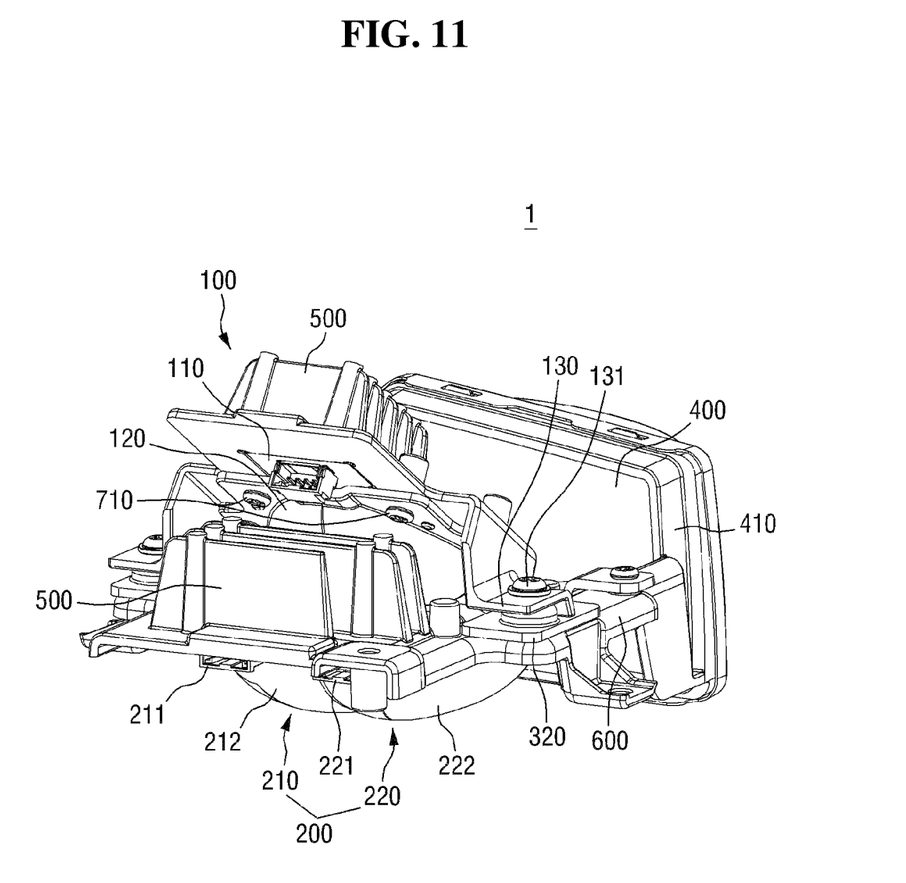
Figure 12:
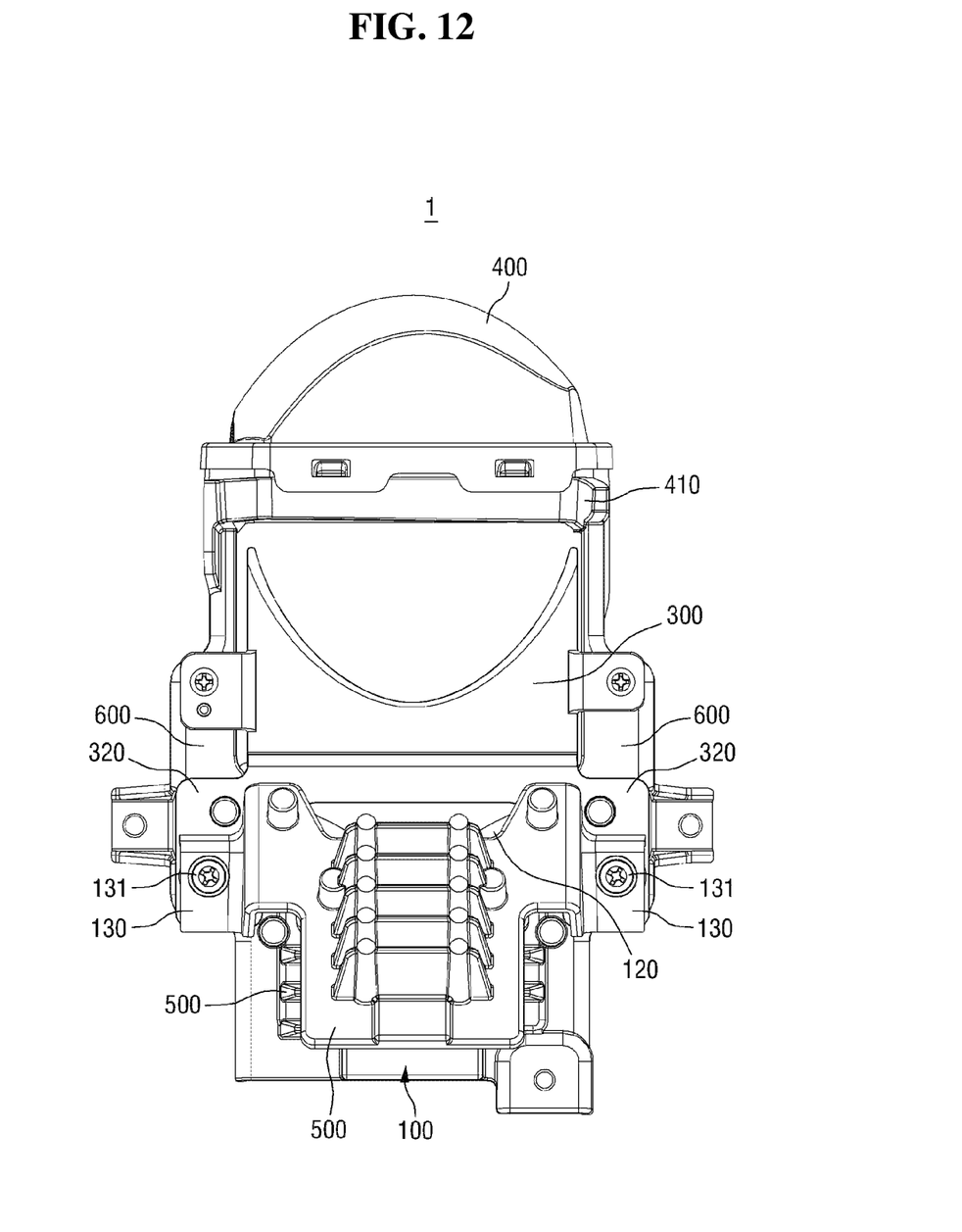
FIG. 12 is a plan view of the assembled automotive headlamp shown in FIGS. 10 and 11.
Figure 13:
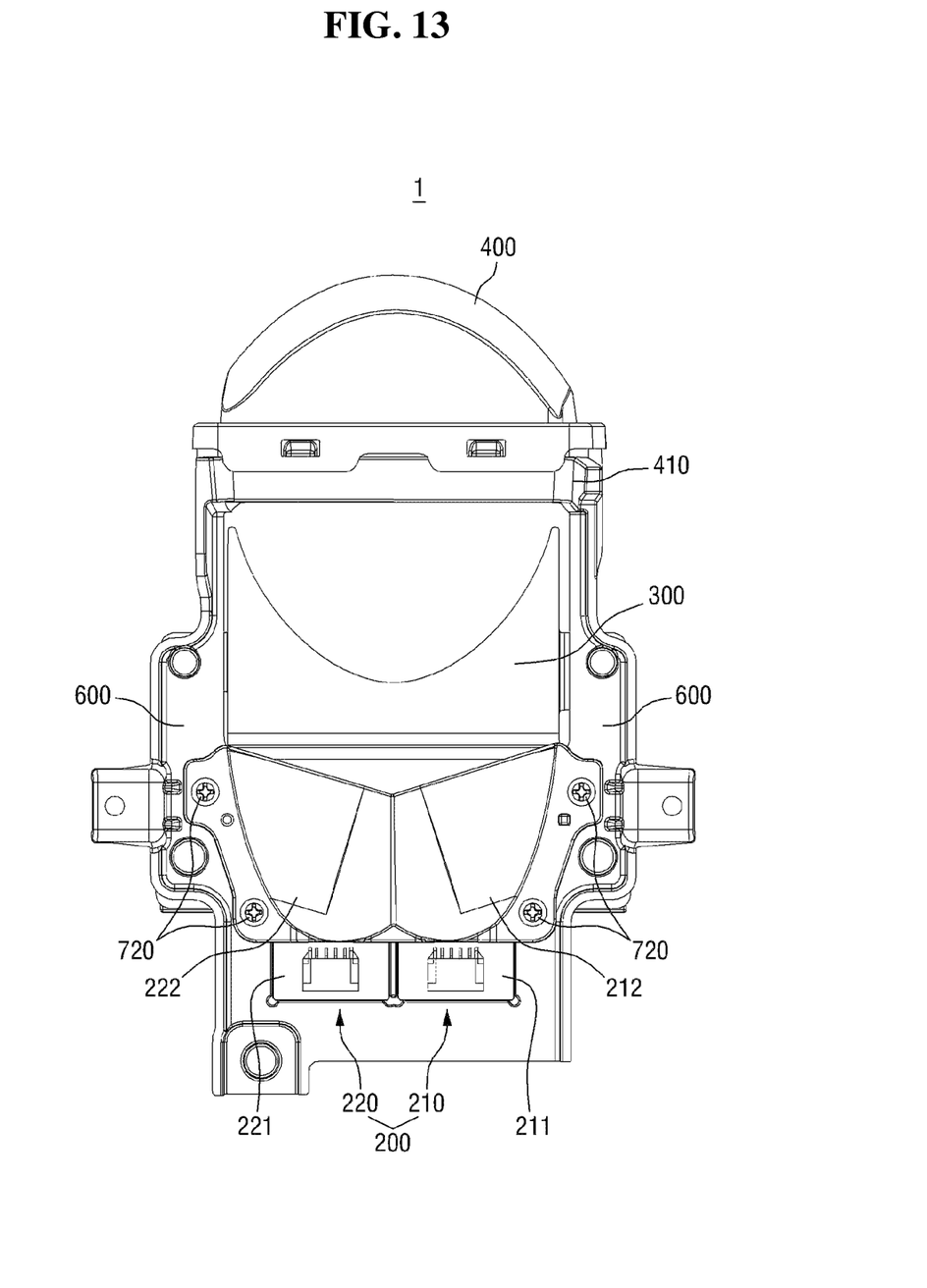
FIG. 13 is a base view of the assembled automotive headlamp shown in FIGS. 10 and 11.

FIGS. 10 and 11 are perspective views of an assembled automotive headlamp 1 according to an embodiment of the present invention. FIG. 12 is a plan view of the assembled automotive headlamp 1 shown in FIGS. 10 and 11. FIG. 13 is a base view of the assembled automotive headlamp 1 shown in FIGS. 10 and 11. In FIGS. 10 through 13, the assembled structure of the automotive headlamp 1 of FIGS. 3, 4 and 9 is illustrated as an example. The same structure may also apply to the automotive headlamp 1 of FIGS. 1 and 2. For simplicity, reference numerals for some elements are omitted. However, elements substantially identical to those of FIGS. 3, 4 and 9 are indicated by like reference numerals.

Referring to FIGS. 10 through 13, in the automotive headlamp 1 according to the current embodiment, a first lamp module 100 may be installed above an optical axis C of a projection lens 400, and a second lamp module 200 may be installed below the optical axis C. In addition, a lamp module 210 and a lamp module 220 of a second lamp module 200 may be disposed in a horizontal orientation to each other.

In the first lamp module 100, a first light source unit 110 may be formed on a bottom surface of a heat sink 500, and a first reflector 120 may be coupled to the heat sink 500 by first coupling members 710 (e.g., first set of screws). In addition, in the lamp module 210 and the lamp module 220, a light source unit 211 and a light source unit 221 may be formed on a bottom surface of a heat sink 500, and a reflector 212 and a reflector 222 may be coupled to the heat sink 500 by second coupling members 720 (e.g., a second set of screws).

In addition, at least one of the heat sinks 500 installed on the first lamp module 100, the lamp module 210 and the lamp module 220 may be integrally connected to a lens holder 410 which supports the projection lens 400 by connecting portions 600. In the current embodiment of the present invention, the heat sink 500 installed on the lamp module 210 and the lamp module 220 may be connected to the lens holder 410 by the connecting portions 600. In the current embodiment of the present invention, the lens holder 410 is connected to at least one of the heat sinks 500 installed on the first lamp module 100, the lamp module 210 and the lamp module 220. However, the present invention is not limited thereto. The lens holder 410 can also be connected to any one of the elements included in each lamp module 100, 210 or 220.

A shield 300 may include an extension portion 320 formed by extending a front end of the shield 300 located near a focus behind the projection lens 400 backward. In the exemplary embodiment of the present invention, the extension portion 320 may be mounted on the connecting portions 600. In addition, the front end of the shield 300 may be curved so that it is gradually displaced toward both sides of the projection lens 400 along a focal plane behind the projection lens 400.

Coupling portions 130 may be formed on one side of the heat sink 500 installed on the first lamp module 100 and may be coupled to a surface of the extension portion 320 which extends backward from the shield 300. Coupling members 131 (e.g., a third set of screws) may be inserted into the coupling portions 130, thereby coupling the coupling portions 130, the extension portion 320 and the connecting portions 600 to each other. In the embodiment of the present invention, the extension portion 320 and the coupling portions 130 are flat plate-shaped portions, and a surface of the extension portion 320 is coupled to respective surfaces of the coupling portions 130 by the coupling members 131. However, the present invention is not limited thereto, and the extension portion 320 and the coupling portions 130 can also be coupled to each other using various coupling methods such as hook coupling and sliding coupling.

In the current embodiment of the present invention, the heat sink 500 installed on the first lamp module 100 is coupled to a surface of the extension portion 320. However, this is merely an example used to help understand the present invention, and the present invention is not limited to this example. At least one of the heat sinks 500 formed on the first lamp module 100 and the lamp module 210 and the lamp module 220 may be coupled to a surface of the extension portion 320 of the shield 300 according to the position or direction of the extension portion 320 which extends from the shield 300.

Advantageously, the above described lamp modules which use LEDs as light sources are placed in different directions from an optical axis of the headlamp, and the other elements are placed so that they can be shared by the lamp modules. Therefore, the space required can be minimized while light can be emitted in various beam patterns. In addition, since a plurality of lamp modules are installed in a predetermined direction from the optical axis of the headlamp, a sufficient amount of light can be secured. Furthermore, heat sinks may be installed on light source units to efficiently prevent a temperature increases due to heat emitted from the LEDs.

However, the effects of the present invention are not restricted to the one set forth herein. The above and other effects of the present invention will become more apparent to one of daily skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. The scope of the present invention is defined by the following claims, rather than by the above-described detailed description. The meanings and scope of the claims, and all modifications or modified shapes, which are derived from equivalent concepts thereof, should be understood as being included in the scope of the present invention.

The invention claimed is:

1. An automotive headlamp comprising:
a plurality of lamp modules disposed in different directions from an optical axis of the automotive headlamp; and
a projection lens projecting light emitted from the plurality of lamp modules; wherein each of the lamp modules includes:
a light source unit emitting light downward; and
a reflector disposed under the light source unit and configured to reflect light emitted from the light source unit;
a shield disposed in front of the lamp modules, wherein the shield forms a low-beam pattern by blocking part of the light emitted from one or more of the lamp modules,
a plurality of heat sinks installed on top surfaces of the light source units of the lamp modules, respectively,
wherein coupling portions which extend from at least one of the heat sinks installed on the top surfaces of the light source units is coupled to a surface of an extension portion of the shield which extends backwards and adjoins the at least one of the heat sinks to the shield.

2. The headlamp of claim 1, wherein lamp modules comprise a first lamp module disposed above the optical axis and a second lamp module disposed below the optical axis.

3. The headlamp of claim 2, wherein the first lamp module is used to emit light in a low-beam pattern, and the second lamp module is used to emit light in a high-beam pattern.

4. The headlamp of claim 1, wherein one or more of the lamp modules include a plurality of lamp modules arranged in a particular direction.

5. The headlamp of claim 1, wherein the light source unit comprises a light source and a substrate having the light source installed on a bottom surface thereof.

6. The headlamp of claim 5, wherein the light source is a light-emitting diode (LED).

7. The headlamp of claim 1, wherein the extension portion of the shield is mounted on respective surfaces of connecting portions of a lens holder which connect at least one of the lamp modules to the lens holder which supports the projection lens.

8. The headlamp of claim 7, wherein the connecting portions are connected between at least one of the heat sinks installed on the light source units and the lens holder.

9. The headlamp of claim 1, wherein heat pads are formed in contact surfaces between the light source units and the heat sinks, respectively.

10. The headlamp of claim 1, wherein each of the heat sinks is a heat spreader or a heat pipe.

11. The headlamp of claim 1, wherein the light source unit is placed at a predetermined angle to the optical axis according to a beam pattern, and the reflector is placed according to the angle of the light source unit.

12. The headlamp of claim 1, wherein each of the heat sinks comprises a plurality of dissipating pins which extend upward above a corresponding light source unit.

* * * * *